US005925464A

United States Patent [19]

Mulqueen et al.

[11] Patent Number: 5,925,464

[45] Date of Patent: Jul. 20, 1999

[54] MICROENCAPSULATION PROCESS AND PRODUCT

[75] Inventors: Patrick Joseph Mulqueen; Geoff Smith, both of Oxon, United Kingdom; Steven D. Lubetkin, Zionsville, Ind.

[73] Assignee: Dow AgroSciences LLC, Indianapolis, Ind.

[21] Appl. No.: 08/875,133

[22] PCT Filed: Nov. 30, 1995

[86] PCT No.: PCT/US95/15543

§ 371 Date: Aug. 8, 1997

§ 102(e) Date: Aug. 8, 1997

[87] PCT Pub. No.: WO96/22159

PCT Pub. Date: Jul. 25, 1996

[30] Foreign Application Priority Data

Jan. 19, 1995 [GB] United Kingdom .................. 9501017

[51] Int. Cl.[6] .................................................. B01J 13/16

[52] U.S. Cl. ................................ 428/402.2; 428/402.21; 428/402.24; 427/213.3; 427/213.31; 427/213.32; 427/213.33; 427/213.34; 264/4.1; 264/4.3; 264/4.32; 264/4.33; 264/4.6; 264/4.7

[58] Field of Search ........................... 428/402.2, 402.21, 428/402.24; 427/213.3, 213.31, 213.32, 213.33, 213.34; 264/4.1, 4.3, 4.32, 4.33, 4.6, 4.7

[56] References Cited

U.S. PATENT DOCUMENTS

| | | | |
|---|---|---|---|
| 4,409,201 | 10/1983 | Heinrich et al. | 264/4.1 |
| 4,489,017 | 12/1984 | Alberts et al. | 264/4.7 |
| 4,847,152 | 7/1989 | Jabs et al. | 264/4.3 |
| 5,225,118 | 7/1993 | Juang et al. | 264/4.7 |
| 5,651,990 | 7/1997 | Takada et al. | 424/497 |

OTHER PUBLICATIONS

U.S. application No. 08/960,937, Mulqueen et al., filed Oct. 30, 1997.

U.S. application No. 08/615,326, Mulqueen et al., filed Aug. 2, 1996.

*Primary Examiner*—Nathan M. Nutter
*Attorney, Agent, or Firm*—D. Wendell Osborne

[57] ABSTRACT

Microencapsulated compositions, useful, for example, as pesticidal formulations, were prepared a process in which the microcapsules containing the encapsulated material are formed in an interfacial polycondensation reaction carried out in the presence of one polyvinylalcohol, a different polyvinylalcohol is added, and the resulting mixture is spray dried.

26 Claims, 2 Drawing Sheets

MICROENCAPSULATION PROCESS AND PRODUCT

This application is filed under 35 USC 371 and claims priority of PCT application PCT/US 95/15543 filed Nov. 30, 1995.

This invention relates to the microencapsulation of various materials, in particular pesticidal materials, to produce both wet and dry formulations. In particular, the invention relates to encapsulating such materials so that the encapsulated product can be diluted in water, in order to produce aqueous pesticidal compositions, which can be applied by conventional spray techniques.

The encapsulation of pesticides, plant growth regulators, and the like is a field which has attracted increasing interest in recent years. For safety and ease of distribution, it is particularly convenient to supply such materials in the form of aqueous dispersions of dry solids, which can be dispersed easily in water for field application.

Various proposals have been made in recent years for the microencapsulation of various pesticidal materials. For example, U.S. Pat. No. 5,160,530 (Griffin) discloses a process for encapsulating pesticides (for example trifluralin), by melting the active material, and combining the melted material with a film-forming polymer, such as a polyvinylalcohol (PVA). The materials are then emulsified together and spray dried.

U.S. Pat. No. 4,244,836 (Hoechst) discloses a similar method of encapsulating pesticidal materials, by spray drying a dispersion of the active material and a PVA.

Although for some systems, the processes disclosed by these references are useful, they suffer from a number of disadvantages, for example that the active material can diffuse within the product leading to crystallisation of the active material in the PVA matrix, and also (particularly in the Griffin method) that undesired polymorphs of the molten active material may he produced upon cooling to ambient temperature.

U.S. Pat. No. 4,936,901 (Monsanto) discloses an alternative method of encapsulation, in which microcapsules containing the active material are formed by means of an interfacial polycondensation reaction, involving an isocyanate/polyamine reaction. The resulting interfacially polymerised microcapsules are subsequently spray dried. This reference mentions that PVA may be used as a suspension adjuvant in the spray drying step. Again, this method results in the production of microcapsules with uncontrollable release characteristics. Also, some active materials show a tendency to diffuse out of the interfacially polymerised microcapsules during storage, thus producing crystallisation (in the case of actives normally solid at ambient temperatures). Another difficulty with this method is that the products which result all have slow release characteristics, because of their large particle size distribution and thick polymer wall.

One particular problem which this reference does not address at all is the production of microcapsules which provide rapid release of the active material, rather than sustained or delayed release. Often a controlled release formulation will be required to produce a rapid biological effect ("knock-down") followed by a sustained release ("residuality") of the active. Rapid release capsules are generally required to be small in size (typically with a volume mean diameter (VMD) less than 5 micrometers) or have extremely thin polymer shell walls. None of the systems prepared in U.S. Pat. No. 4,936,901 have the small particle size normally required to provide rapid knock-down. The only information about particle size giver in the reference is that the size distribution (not the VMD) is from 1–50 microns. The surfactants taught as essential to the reference are of a kind which would not be suitable for the formation of such capsules with a VMD of less than 5 micrometers.

It is known furthermore from, for example EP-A-0611253, U.S. Pat. No. 5,332,584 and U.S. Pat. No. 5,324,584 to use PVAs as surfactants or protective colloids in pesticide encapsulation processes. These references do not suggest however that the PVA takes an active part In shell wall formation, such that it can influence and permit effective control over the release characteristics of the microcapsules produced.

We have found by incorporating a PVA into an interfacial polycondensation system for producing microcapsules, and subsequently spray drying the resulting microcapsules in the presence of the PVA and optionally a further quantity of PVA which may be the same or different from the one adopted in the microencapsulation step, microcapsules can be obtained which show improved storage stability, especially to the leaching of the active material from the resulting microcapsules, particularly when the microcapsules are small in size, (for example less than 5 micrometer).

Accordingly, in a first embodiment of the invention, there is provided a process for preparing an encapsulated material, which process comprises forming microcapsules containing the material by an interfacial polycondensation reaction, and spray drying the resulting microcapsules in the presence of a polyvinylalcohol (PVA), wherein the PVA is present during the interfacial polycondensation reaction forming the microcapsules.

As indicated above, a further quantity of PVA, which may preferably be one which is different from the one used in the interfacial polycondensation step, may be added to the mixture containing the microcapsules, prior to the spray drying step.

The PVA employed in the microencapsulation step may be one with a degree of polymerisation of from 50 to 5,000, and a degree of hydrolysis of from 70% to 100%. Desirable characteristics for the PVA are that it should be an efficient emulsifier prior to the polycondensation step, that it can assist the stabilisation of the capsules whilst they are forming, and also that it can assist the re-wetting of the capsules after spay drying when they are ultimately used. These requirements are not all optimally met in a single PVA grade. A good compromise has been found to be a material having a degree of polymerisation of about 300, and a degree of hydrolysis of about 88%.

The additional PVA which may be added prior to the spray drying step is mainly selected on the basis of its poor solvent qualities for the encapsulated material, and for its ease of re-wetting in cold (and possibly hard) water. Chemically modified PVAs, such as the sulphonated or carboxylated PVAs, are particularly useful for this purpose.

The interfacial polycondensation to form the microcapsules may be carried out by any of the various methods known to those skilled in the art.

In a preferred embodiment, the interfacial polycondensation reaction in the presence of the PVA is carried out using a polyisocyanate and a polyamine. Because the PVA is present during the polycondensation reaction which forms the microcapsule walls, and because its surfactant nature ensures both a high concentration and preferred orientation at the oil/water interface, the PVA, having pendant —OH groups, reacts with the isocyanate to incorporate polyurethane groups into the polymeric microcapsule walls. The permeability of polyurethane polymers is quite different from that the of the polyurea which is formed by react-on of the polyisocyanate with the polyamine. Other interfacial polycondensation reactions which may be employed are, for example isocyanate/polyol, isocyanate/water, and isocyanate/acid chloride reactions.

The material which is encapsulated may be a pesticidal material, for example

| | |
|---|---|
| amitraz | phosalone |
| azinphos-ethyl | phosfolan |
| azinphos-methyl | phosmet |
| benzoximate | promnecarb |
| bifenthrin | quinalphos |
| binapacryl | resmethrin |
| bioresmethrin | temephos |
| chlorpyrifos | tetramethrin |
| chlorpyrifos-methyl | xylylcarb |
| cyanophos | acrinathrin |
| cyfluthrin | allethrin |
| cypermethrin | benfuracarb |
| bromophos | bioallethrin |
| bromopropylate | bioallethrin S |
| butacarboxim | bioresmethrin |
| butoxycarboxin | buprofezin |
| chlordimeform | chlorfenvinphos |
| chlorobenzilate | chlorflurazuron |
| chloropropylate | chlormephos |
| chlorophoxim | cycloprothrin |
| fenamiphos | betacyfluthrin |
| fenobucarb | cyhalothrin |
| gamma-HCH | cambda-cyhalothrin |
| methidathion | alpha-cypermethrin |
| deltamethrin | beta-cypermethrin |
| dicofol | cyphenothrin |
| dioxabenzafos | dimeton-S-methyl |
| dioxacarb | dichlorvos |
| endosulfan | disulfoton |
| EPNethiofencarb | edifenphos |
| dinobuton | empenthrin |
| tetradifon | esfenvalerate |
| tralomethrin | ethoprophos |
| N-2,3-dihydro-3-methyl-1,3 | etofenprox |
| thiazol-2-ylidene-2,4- | etrimphos |
| xylidene | fenazaquin |
| parathion methyl | fenitrothion |
| fenthiocarb | phenothrin |
| fenpropathrin | phenthoate |
| fenthion | pirimiphos-ethyl |
| fenvalerate | pirimiphos-methyl |
| flucythrinate | profenofos |
| flufenoxuron | propaphos |
| tau-fluvalinate | propargite |
| formothion | propetamphospyrachlofos |
| hexaflumuron | tefluthrin |
| hydroprene | terbufos |
| isofenphos | tetrachlorinphos |
| isoprocarb | tralomethrin |
| isoxathion | triazophos |
| malathion | pyrachlofos |
| mephospholan | tefluthrin |
| methoprene | terbufos |
| methoxychlor | tetrachlorinphos |
| mevinphos | tralomethrin |
| permethrin | triazophos |
| the following fungicides:- | |
| benalaxyl | biteranol |
| bupirimate | cyproconazole |
| carboxin | tetraconazole |
| dodemorph | difenoconazole |
| dodine | dimethomorph |
| fenarimol | diniconazole |
| ditalimfos | ethoxyquin |
| myclobutanil | etridiazole |
| nuarimol | fenpropidin |
| oxycarboxin | fluchloralin |
| penconazole | flusilazole |
| prochloraz | imibenconazole |

-continued

| | |
|---|---|
| tolclofos-methyl | myclobutanil |
| triadimefon | propiconazole |
| triadimenol | pyrifenox |
| azaconazole | tebuconazole |
| epoxyconazole | tridemorph |
| fenpropimorph | triflumizole |
| the following herbicides:- | |
| 2,4-D esters | bifenox |
| 2,4-DB esters | bromoxynil esters |
| acetochlor | bromoxynil |
| aclonifen | butachlor |
| alachlor | butamifos |
| anilophos | butralin |
| benfluralin | butylate |
| benfuresate | carbetamide |
| bensulide | chlomitrofen |
| benzoylprop-ethyl | chlorpropham |
| cinmethylin | flurochloralin haloxyfop |
| clethodim | ethoxyethyl |
| clomazone | haloxyfop-methyl |
| clopyralid esters | ioxynil esters |
| CMPP esters | isopropalin |
| cycloate | MCPA esters |
| cycloxydim | mecoprop-P esters |
| desmedipham | metolachlor |
| dichlorprop esters | monalide |
| diclofop-methyldiethatyl | napropamide |
| dimethachlor | nitrofen |
| dinitramine | oxadiazon |
| ethalfluralin | oxyfluorfen |
| ethofumesate | pendimethalin |
| fenobucarb | phenisopham |
| fenoxaprop ethyl | phenmedipham |
| fluazifop | picloram esters |
| fluazifop-P | pretilachlor |
| fluchloralin | profluralin |
| flufenoxim | propachlor |
| flumetralin | propanil |
| flumetralin | propaquizafop |
| fluorodifen | pyridate |
| fluoroglycofen ethyl | quizalofop-P |
| fluoroxypyr esters | triciopyr esters |
| flurecol butyl | tridiphane |
| | trifluralin |

Other pesticides such as the nitrification inhibitor nitrapyrin may also be employed. The compositions of the invention may also incorporate mixtures of two or more pesticides which may in some embodiments form a eutectic mixture having a melting point lower than that of the separate components.

The pesticide may be an organosoluble derivative of a pesticidal compound which is itself poorly organosoluble or insoluble.

The active material may be present in amounts of, for example, from 30 to 90 weight percent, preferably from 60 to 85 more preferably from 75 to 80 weight percent based on the spray dried formulation.

As indicated above, the method of the invention is particularly advantageous for the production of microcapsules having a small particle size, for example having a VMD of 5 micrometers or less, particularly 2 micrometers or less. The chief advantages of such small capsules are that they provide a higher surface area to mass ratio than Larger particles, and thus give an enhanced release rate and better knock-down. Further, such small capsules can penetrate soil or surface grass thatch better than larger capsules, and so are more efficacious in certain applications where such soil or thatch mobility is needed. Yet another benefit of such small capsules is that, as the VMD decreases, it is possible to retain greatly increased amounts of supercooled active in the liquid form. It is thus possible to produce in a reliable manner liquid core capsules without the use of solvents, which in turn fives environmental advantages, as well as higher active loadings in the final product.

The presence of a liquid core in capsules made with a supercooled molten active has several advantages, of which the most significant from point of view of the present invention is that a liquid core will in general release its active more rapidly than will a solid. This combined with small particle size gives a significant increase in active release rate. A second advantage is that the core does not crystallise, thus causing rupture of the capsules, which can lead both to premature release, and to formulation instability on storage. A third advantage of retaining the active in the liquid state is that there is no possibility of producing a biologically less active polymorph during crystallisation—a problem which is addressed in another way in U.S. Pat. No. 5,160,530 (Griffin).

Clearly, where the active is dissolved in a solvent, these problems are not encountered. Any water-insoluble solvent may be employed if a solvent is deemed desirable. Examples of typical solvents are aromatic solvents, particularly alkyl substituted benzenes such as xylene or propyl benzene fractions, and mixed naphthalene and alkyl naphthalene fractions; mineral oils; kerosene, dialkyl amides of fatty acids, particularly the dimethyl amides of fatty acids such as the dimethyl amide of caprylic acid; chlorinated aliphatic and aromatic hydrocarbons such as 1,1,1-trichloroethane and chiorobenzene, esters of glycol derivatives, such as the acetate of the n-butyl, ethyl, or methyl ether of diethyleneglycol, the acetate of the methyl ether of dipropyleneglycol, ketones such as isophorone and trimethylcyclohexanone (dihydroisphorone) and the acetate products such as hexyl, or heptylacetate. The preferred organic liquids are xylene, propyl benzene fractions, alkyl acetates, and alkyl naphthalene fractions.

An advantage of the encapsulation method in which the PVA is present during the encapsulation reaction, is that by altering the time before the addition of the polyamine, the amount of polyurethane and polyurea in the capsule wall can be controlled with some accuracy. Since these two polymers have very different diffusivities for the encapsulated material, this ratio of polyurethane/polyurea provides a further, independent method for controlling the release rate of the active, in addition to the control provided by varying capsule wall thickness and capsule size.

In another embodiment, the solvent may be a polymerisable monomer for example an ethylenically unsaturated monomer (such as styrene, alphamethlystyrene, (m)ethylmethacrylate, a vinyl halide, or acrylonitrile) which is subsequently polymerised to give a matrix core to the capsules, thus adding further to the control of the release rate of the active.

A further advantage of the encapsulation method in which the PVA is present during the encapsulation reaction, is that because of its multiplicity of pendant —OH groups, the PVA becomes chemically bonded to the capsule wall during the shell-forming reaction. This bonding produces some terminally attached PVA ("tails"), some doubly attached PVA ("loops") and some multiply attached PVA ("trains"). Having non-attached PVA present particularly during the subsequent spray drying step to produce a dry product may be a disadvantage. In spray crying, the concentration (of PVA, capsules and any added solutes, for example, salts) rises very rapidly. The intention is to produce a uniform layer of water-soluble polymer around each capsule, and that this should film-form when dry. It is clear that depletion flocculation may occur as the concentration increases during he drying process. Thus capsule-capsule contacts may occur, leading to irreversible coagulation. The presence of loops and trains affords a substantial measure of protection against both these causes of poor re-wetting and colloidal instability. They also have a further significant benefit, in that they allow substantial amounts of electrolyte to be added to the capsule suspension, and such electrolytes assist in the quick re-wetting of the dried product, as taught EP-A2-0568379 (Rohm & Haas). The addition of any high concentration of electrolyte to conventional capsule suspensions generally leads to irreversible coagulation of the capsules.

A further advantage of the encapsulation method in accordance with the invention is that it permits the production of dry compositions containing two or more active materials, where the materials are such that direct formulation of the materials (ie, without encapsulation of one or both of them) would lead to a product which is chemically or physically unstable. In one aspect, the said actives may be separately encapsulated, but in an alternative and preferred embodiment, one or more of the active materials (or some portion of a single active material) may be encapsulated by the method in accordance with the invention, and the balance not encapsulated. In this way, the unencapsulated active material is immediately biologically available upon application, whereas the encapsulated material is released more slowly. The amount of each material employed in such different forms will vary dependent upon the particular application but in general terms, each such material may constitute from 0.1 to 99.9% by weight of the total of the encapsulated material.

The microcapsules in accordance with the invention may be prepared by high shear mixing of a solution or a melt containing the active material (eg. pesticide) the PVA (as an aqueous solution), and one of the materials for producing the interfacial polycondensation (eg. isocyanate). The PVA acts as an emulsifier, and in some systems, no further emulsifier may be required. It is desirable however to add additional emulsifiers, which may be of generally known type in order to produce the desired emulsion of small particle size. When the size of the emulsion is as desired, then the other polymeric cross-linker is added (eg. polyamine), to complete the interfacial polycondensation.

As indicated above, a preferred reactant for the polycondensation is a polyamine, which is usually a water soluble, reactive polyamine, such as diethylene triamine or tetraethylene pentamine. These amines start to react with the isocyanate at the interface as soon as they are added to the emulsion. More complete control can sometimes be achieved by using either a water-soluble amine salt, or an oil-soluble amine salt, dissolved respectively in the aqueous phase or the oil phase at an early stage in the process (for example, before emulsification. By virtue of the fact that they are salts, they do not immediately react with the isocyanate, but do so promptly when the pH is adjusted to liberate the free amine, whereupon cross-linking occurs.

The high shear mixing can be performed on a batch of the ingredients, or may be conducted continuously (in-line). In the former case, the time of addition or release the reactive amine is governed by the processing time required to form the emulsion with the correct particle size distribution (which clearly is batch size dependent), whilst in the latter case, the interfacial reaction can be better controlled, since the amine can be added/released at any desired time simply by choice of injection point in the process stream, thus giving essentially complete control over the urea/urethane ratio.

As indicated above, all of the PVA employed in the process of the invention may be added at the outset, for formation of the microcapsules. Usually, however, it is preferable to add additional PVA after microcapsule formation, but before spray drying. The ratio of the amount of PVA added at the second stage to that added initially present is typically at least 0.5:1.

Other conventional additives may also be incorporated into the formulation such as emulsifiers, dispersants, disintegration aids, salts and film-forming polymers.

BRIEF DESCRIPTION OF THE DRAWINGS

A number of preferred embodiments of the invention are described in the following Examples, and certain characteristics of those Examples are illustrated in the accompanying drawings, in which.

EXAMPLE 1

Figure 1:
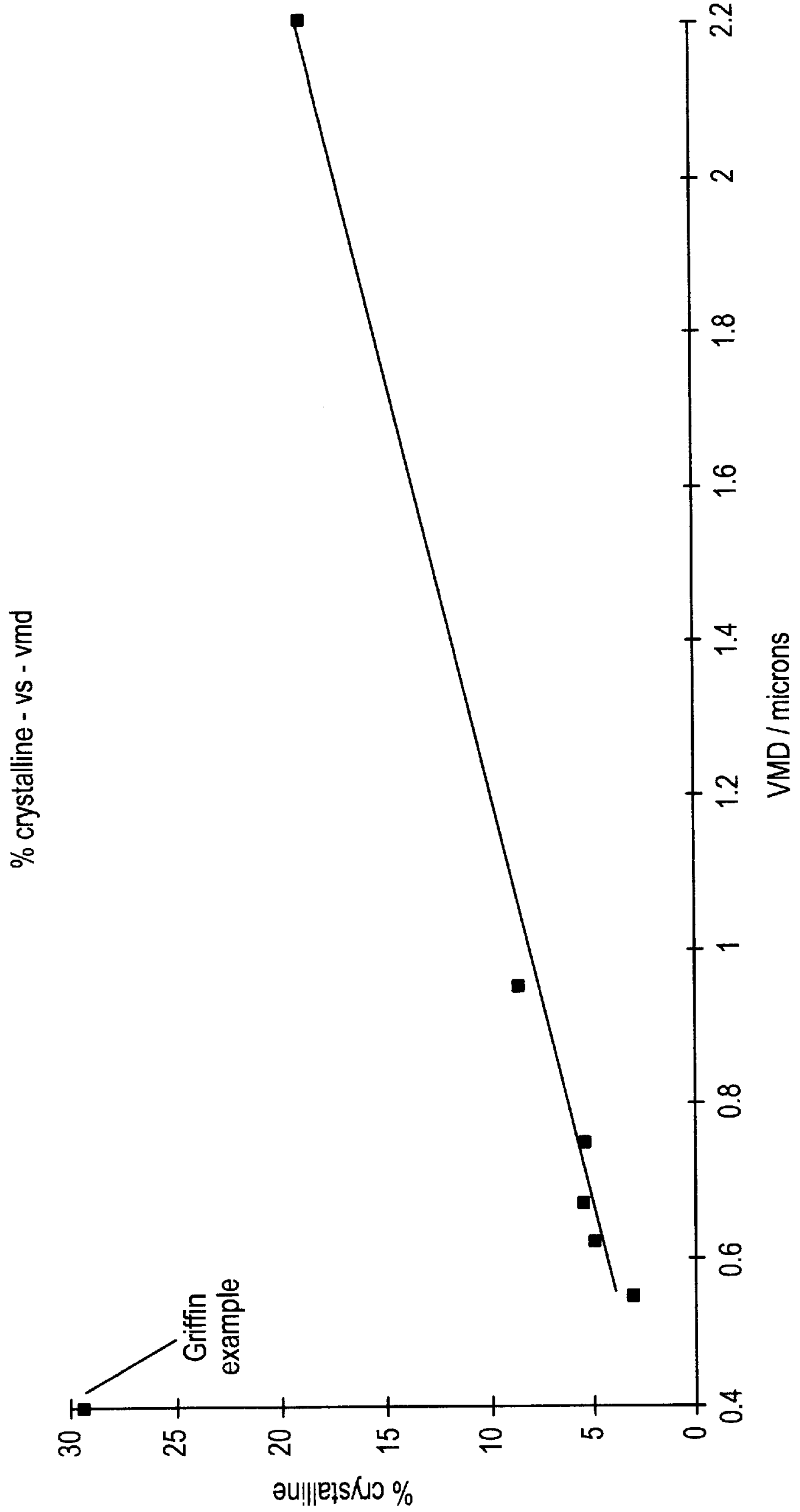
FIG. 1 illustrates the dependence of crystallinity on VMD.

An emulsion was prepared by high shear mixing of an aqueous 20% w/w PVA solution (GLO3, Nippon Gohsei, 88% hydrolysed, degree of polymerisation approximately 300) maintained at 55° C. in a water bath. Molten chlorpyrifos was mixed with a polymeric isocyanate (VORANATE M220, in the amount shown below, and the mixture added to the PVA solution in the water bath, under high shear.

| | | |
|---|---|---|
| Chlorpyrifos technical | 93.9 | g |
| Voranate M220 | 4.7 | g |
| GLO3 | 12 | g as 15% w/w solution |
| Diethylene triamine | 1.25 | g dissolved in 65 g water |

In samples of around 100 g or so, a mixing time of 30 seconds was sufficient to reduce the VMD to below one micrometer, whilst for larger samples (500 g) a time of around 90 seconds was needed to reach a VMD of around of 1 micrometer.

When the target VMD was achieved, the diethylenetriamine was added under high shear.

Reaction of the isocyanate with the polyamine and PVA produced microcapsules containing the active material dispersed in the aqueous phase.

To produce a dry product, the wet capsule phase was then mixed (5 kg) with 0.855 kg GLO3 as a 21% aqueous solution together with deionised water to adjust the suspension viscosity to an appropriate level for spray drying (conveniently about 100 mPas). The microcapsule suspension was spray-dried producing a dry product containing approximately 75% w/w chlorpyrifos. The further PVA was such as to provide a ratio of approximately 66 percent of the first PVA, and 33 percent of the further PVA in the dry product. The spray drying was carried out using an inlet temperature of from 120° C. to 150° C., and an outlet temperature of from 65° C. to 85° C. The product was a slightly off white free flowing powder with a water content of approximately 0.5 percent. The particle size (vmd) or the wet capsule product and of the dry product when put into water and allowed to disperse were both about 1 micrometer.

Release Rate Test

The release rate of the product was tested by spraying a dilution containing 1000 ppm by weight of active material onto glass slides and measuring the amount left after storing the slides in a fixed temperature environment at 20° C. with constant air-flow for 24 hours. The product from Example 1 gave a residual figure of 95% retained on the glass slide.

EXAMPLE 2

Wet capsules were prepared in a similar manner to Example 1, but as a continuous process using an "in-line" mixer, and using the following recipe:—

| | |
|---|---|
| Chlorpyrifos technical | 93.9 g |
| Voranate M220 | 2.94 g |
| GLO3 | 16.8 g as a 21% aqueous solution |
| Diethylenetriamine | 1.56 g dissolved in 65 g water |

This wet capsule phase (5 kg) was then mixed with 200 g of a 10% solution of a carboxylated PVA (Trade Mark KM118) and spray-dried as described above to produce a dry product containing approximately 75% w/w chlorpyrifos. The particle size (VMD) of the wet capsule product and the dry product when put into water and allowed to disperse was about 0.6 micron. A glass slide residue test with this product showed only 30% remaining after a 24 hour storage period, illustrating the control over the release characteristics possible with this invention.

The chief differences between Examples 1 and 2 are:

(i) Example 1 has more isocyanate, and therefore thicker walls than Example 2.

(i) Example 1 has a larger VMD than Example 2, and so has a proportionately lower interfacial area.

(iii) Because Example 2 was made in-line, and Example 1 was made by a batch process, the amine was added earlier in Example 2 than in Example 1.

(iv) Because of its increased particle size (VMD=1 $\mu$m), Example 1 was more crystalline than Example 2, with about 10% in the solid form, compared to a VMD of about 0.55 $\mu$m and % crystalline of about 3% for Example 2.

Figure 2:
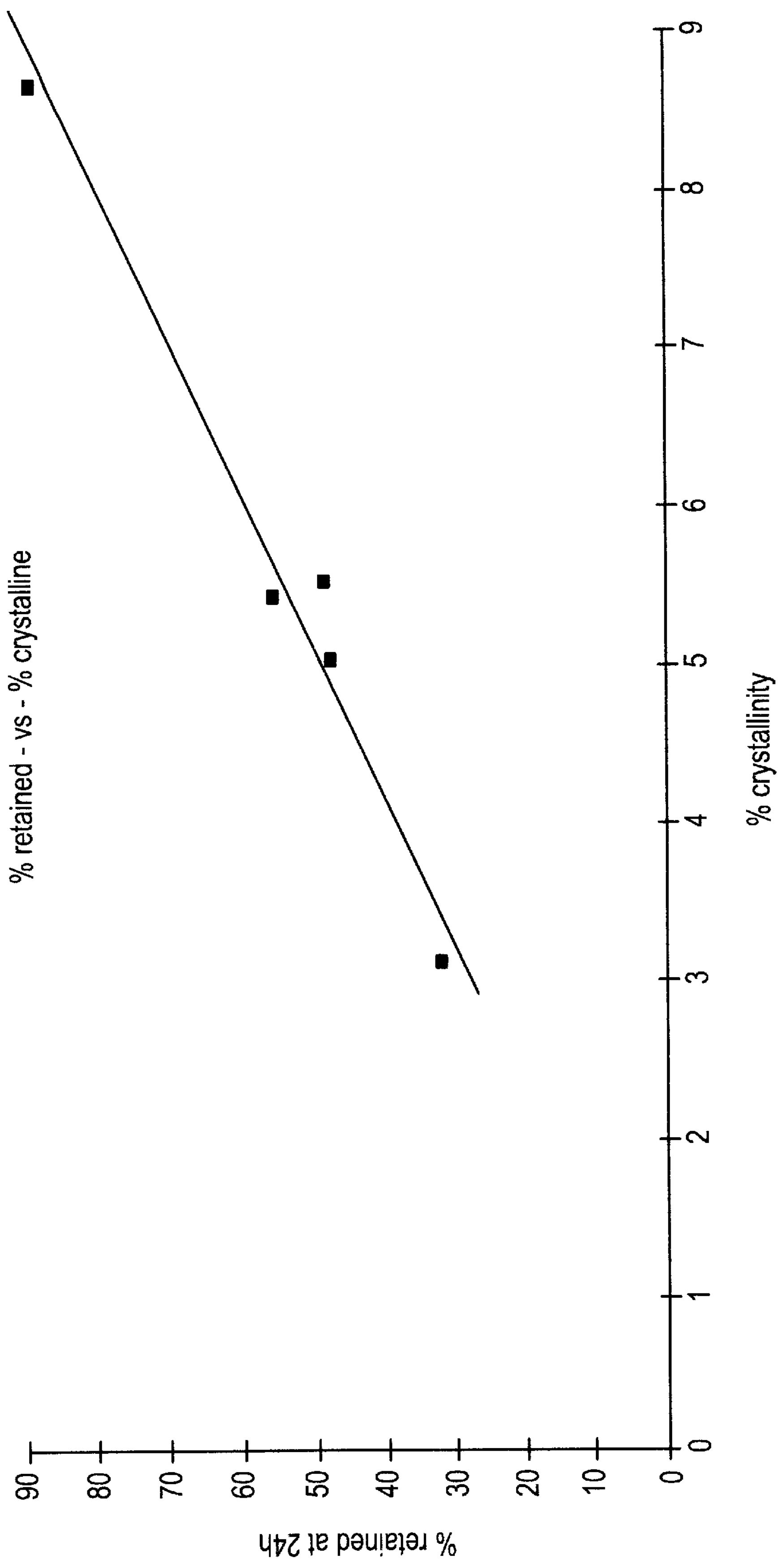
FIG. 2 illustrates the effect of crystallinity on residuality.

Each of these factors results in a more rapid release for Example 2 than for Example 1, as is clearly shown by the very much lower amount of active retained at 24 h for Example 2 than for Example 1. The excellent correlation between % crystallised and the % retained at 24 h on a glass slide is shown by FIG. 2.

EXAMPLES 3 to 6

Further compositions were prepared by the same general method as in Example 1, by varying the amounts of the materials as shown in Table 1 (amounts are in grams). Table 1 illustrates the ease with which release characteristics may be controlled.

TABLE 1

| | EXAMPLE NO | | | |
|---|---|---|---|---|
| | 3 | 4 | 5 | 6 |
| Chlorpyrifos | 42.29 | 42.29 | 48.59 | 48.59 |
| Voranate | 7.09 | 7.09 | 0.79 | 0.79 |
| GLO3 | 2.00 | 12.00 | 2.00 | 12.00 |
| Water | 38.00 | 28.00 | 38.00 | 28.00 |
| Diethylenetriamine | 1.91 | 1.91 | 0.21 | 0.21 |
| Water | 8.71 | 8.71 | 10.41 | 10.41 |
| Particle Size | 10.91 | 0.48 | 9.05 | 0.96 |
| Release rate - % retained after 24 hours | 86 | 81 | 64 | 5 |

All these wet capsule systems were mixed with GLO3 in sufficient quantity to produce a 75% chlorpyrifos product and spray-dried according to the technique outlined above.

In a comparative study employing a methyl-capped nonionic surfactant (ATLOX 4849B) used as a direct replacement for the PVA in Example 6 above a particle size of 0.45 microns was achieved. This product was then sprayed dried, but unsuccessfully, forming a waxy deposit in the spray-drier. All the products of the invention in Examples 1–6 were spray-dried in high yield and were stable on storage.

EXAMPLES 7 to 9

Three products were prepared from the following recipe:

TABLE 2

| | |
|---|---|
| Chlorpyrifos technical | 95.06 g |
| Voranate M220 | 2.94 g |
| GLO3 | 7.54 g |
| Water | 30.16 g |

All these emulsified to produce an emulsion at 50 deg. C. to which was then added:

| | |
|---|---|
| Diethylenetriamine | 1.90 g in 77.7 g water |

In each of these Examples the time taken before addition of diethylenetriamine was varied so as to alter the ratio of polyurea and polyurethane in the capsule wall. This was measured by an infra-red technique. The release rates on these three different batches were measured as before.

TABLE 2

| Example | Time before DETA addition (minutes) | particle size microns | urea:urethane ratio | Release rate (% retained) |
|---|---|---|---|---|
| 7 | Immediate | 0.62 | 2.94:1 | 85 |
| 8 | 1 minute | 0.68 | 2.36 | 70 |
| 9 | 6 minutes | 0.74 | 1.69 | 55 |

It can be seen that altering the urea:urethane ratio with this technique is a useful tool with which to control the release characteristics of a product. In a similar manner a series of products was prepared whereby the release rate was varied from about 100% remaining after 24 hours to less than 10% just by alteration of the urea:urethane ratio by the technique described above.

EXAMPLE 10

Chlorpyrifos-methyl was dissolved in an aromatic solvent (Solvesso 200) and then encapsulated using the technique above, using the following recipe.

| | |
|---|---|
| Chlorpyrifos-methyl | 42 g (technical) |
| Solvesso 200 | 20 g |
| Voranate M-229 | 1 g |
| GLO3 | 4 g (as a 10% aqueous solution) |
| diethylenetriamine | 0.3 g dissolved in 9.7 g water |

This wet capsule phase had a particle size (vmd) of 1.72 microns. The product was mixed with sufficient PVA solution (GLO3) to produce a dry product containing approximately 50% w/w chlorpyrifos-methyl when spray dried as above to give a free-flowing powder containing about 50% w/w chlorpyrifos-methyl as an encapsulated product. This product was stable on storage, releasing the small capsules readily on addition to water. The product on addition to water produced a particle size (vmd) of 1.66 microns, demonstrating the ability of such products to disperse back to the wet capsule size distribution on addition to water.

EXAMPLE 11

A series of products containing chlorpyrifos were prepared with different particle size distributions and these produces were stored at ambient temperature. Chlorpyrifos has a melting point of about 40–42 deg C. At ambient temperature, such encapsulated products would be expected to crystallise over a period of time. The occurrence of crystallisation can be determined by the use of Differential Scanning Calorimetry (DSC) where the melting-point endotherm can be used to indicate how much of a product is in the crystalline state. Using this technique it was found that surprisingly very little chlorpyrifos crystallised in the systems of the invention, as compared to a product prepared according to U.S. Pat. No. 5,160,530 (Griffin) in which chlorpyrifos was emulsified in a solution of PVA and then spray-dried to produce a dry product. FIG. 1 illustrates the dependence of the measured crystallinity on particle VMD, for a number of compositions in accordance with the invention, as compared with the corresponding Example produced according to U.S. Pat. No. 5,160,530 ("Griffin Example"). It can be seen that the Griffin Example has a degree of crystallinity of about 30%, with a VMD of 0.4 micrometers, whilst the expected value for a material of this size encapsulated in accordance with the invention would be about 3%. Clearly the encapsulation results in a surprising stabilisation of the metastable liquid state. The effect of crystallinity (and thus, indirectly, of particle size) on residuality is illustrated in FIG. 2. Very little crystallisation is seen with products of the invention (up to 15% with a 2.2 micron (vmd) capsule) but about 30% with a product of the Griffin route (which actually had a vmd for the emulsion of about 0.4 micrometer).

We claim:

1. A process for preparing an encapsulated material, which process comprises forming microcapsules containing the material by an interfacial polycondensation reaction carried out in the presence of a first polyvinylalcohol, adding a second polyvinyl alcohol, and spray drying the resulting mixture, with the proviso that said first polyvinylalcohol and second polyvinylalcohol are different.

2. A process as claimed in claim 1 wherein the first polyvinylalcohol has a degree of hydrolysis of from 70 to 100%, and a degree of polymerisation of at least 50.

3. A process as claimed in claim 2, wherein the first polyvinylalcohol has a degree of hydrolysis of about 88%, and a degree of polymerisation of about 300.

4. A process as claimed in claim 1 wherein the second polyvinylalcohol is a carboxylated or sulfonated polyvinylalcohol.

5. A process as claimed in claim 1 wherein the the polycondensation reaction is the reaction of a polyisocyanate and a polyamine.

6. A process as claimed in claim 1 wherein the encapsulated material is present in an amount of from 30 to 95 weight percent of the spray dried microcapsules.

7. A process as claimed in claim 6 wherein the encapsulated material is present in an amount of from 60 to 85 weight percent of the spray dried microcapsules.

8. A process as claimed in claim 1 wherein the spray dried microcapsules have a volume median particle size of 5 micrometers or less.

9. A process as claimed in claim 8, wherein the spray dried microcapsules have a volume median particle size of 2 micrometers or less.

10. A process as claimed in claim 1 wherein the material encapsulated is present in the form of a solution in a solvent.

11. A process as claimed claim 1 wherein the material encapsulated comprises a pesticide.

12. A process as claimed in claim 11 wherein the pesticide is chlorpyrifos.

13. A process as claimed in claim 11 wherein the pesticide is chlorpyrifos; the the first polyvinylalcohol has a degree of hydrolysis of from 70 to 100 percent, and a degree of polymerisation of at least 50; the second polyvinylalcohol is a carboxylated or sulfonated polyvinylalcohol; the polycondensation reaction is the reaction of a polyisocyanate and a polyamine; the encapsulated material is present in an amount of from 60 to 85 weight percent of the spray dried microcapsules; the spray dried microcapsules have a volume median particle size of 2 micrometers or less; and the material encapsulated is present in the form of a solution in a solvent.

14. Microcapsules containing an encapsulated material obtained by a process which comprises forming microcapsules by an interfacial polycondensation reaction carried out in the presence of a first polyvinylalcohol, adding a second polyvinylalcohol, and spray drying the resulting mixture, with the proviso that said first polyvinylalcohol and second polyvinylalcohol are different.

15. Microcapsules as claimed in claim 14 wherein the first polyvinylalcohol has a degree of hydrolysis of from 70 to 100 percent and a degree of polymerisation of at least 50.

16. Microcapsules as claimed in claim 15 wherein the first polyvinylalcohol has a degree of hydrolysis of about 88 percent and a degree of polymerisation of about 300.

17. Microcapsules as claimed in claim 14 wherein the second polyvinylalcohol is a carboxylated or sulfonated polyvinylalcohol.

18. Microcapsules as claimed in claim 14 wherein the polycondesation reaction is the reaction of a polyisocyanate and a polyamine.

19. Microcapsules as claimed in claim 14 wherein the encapsulated material is present in an amount of from 30 to 95 weight percent of the spray dried microcapsules.

20. Microcapsules as claimed in claim 19 wherein the encapsulated material is present in an amount of from 60 to 85 weight percent of the spray dried microcapsules.

21. Microcapsules as claimed in claim 14 wherein the spray dried microcapsules have a volume median particle size of 5 micrometers or less.

22. Microcapsules as claimed in claim 21 wherein the spray dried microcapsules have a volume median particle size of 2 micrometers or less.

23. Microcapsules as claimed in claim 14 wherein the material encapsulated is present in the form of a solution in a solvent.

24. Microcapsules as claimed in claim 14 wherein the material encapsulated comprises a pesticide.

25. Microcapsules as claimed in claim 24 wherein the pesticide is chlorpyrifos.

26. Microcapsules as claimed in claim 25 wherein wherein the pesticide is chlorpyrifos; the first polyvinylalcohol has a degree of hydrolysis of from 70 to 100 percent and a degree of polymerisation of at least 50; the second polyvinylalcohol is a carboxylated or sulfonated polyvinylalcohol; the polycondensation reaction is the reaction of a polyisocyanate and a polyamine; the encapsulated material is present in an amount of from 60 to 85 weight percent of the spray dried microcapsules; the spray dried microcapsules have a volume median particle size of 2 micrometers or less; and the material encapsulated is present in the form of a solution in a solvent.

* * * * *